United States Patent Office 3,463,642
Patented Aug. 26, 1969

3,463,642
METHOD AND TEA POWDER FOR AGGLOMERATION
Theodore Sigman, New Hartford, N.Y., assignor to Salada Foods Ltd., Don Mills, Canada
Filed June 23, 1965, Ser. No. 466,150
Int. Cl. A23f 3/02
U.S. Cl. 99—77                        1 Claim

ABSTRACT OF THE DISCLOSURE

Dry fine tea powder is fed to a zone where it is moistened and then subjected to vibratory circulatory movement with the result that a portion agglomerates collecting at the centre of the zone from which it is removed for subsequent drying; the remainder of the powder which does not agglomerate moves outwards of the centre of the zone and is thereby separated from the agglomerated material.

---

This invention relates generally to an agglomeration of fine particles into larger clusters with the purpose of increasing their solubility in liquids and has particular relationship to the agglomeration of tea powder as an aid to its solubility in water.

Dry tea powder is commonly produced by spray drying dilute tea extracts and in the form of granular powder is readily dispersed in warm water.

However, tea powders as fine as 150 microns in diameter are not desirable because when a mass of such material is introduced into cold water for the purpose of making instant tea a film of wet powder is formed which prevents the wetting and dissolution of dry particles positioned on the film. Stirring only tends to complete the film and entrap the dry particles within thus inhibiting dissolution.

It is an object of the present invention to provide a process capable of agglomerating fine food powders such as tea powder, into clusters which are heavy enough to overcome surface tension on dissolution in cold fluids and thereby sink on wetting.

It is a particular advantage in the process of the invention that the agglomerates are continuously isolated from the feed as they are formed and are easily separable.

Additional objects and features of the invention would appear from the description in which the preferred embodiment has been set forth in detail in conjunction with the accompanying drawings, in which.

In accordance with the present invention fine particles of a powder, which may be as fine as 150 microns and formed from material such as tea, have imparted to them a vibratory circulatory motion about a central point, this motion taking place in a humid atmosphere. The circulatory or rotary movement imparts a rolling motion to the particles promoting contact between them and subsequent agglomeration followed by the automatic separation of the agglomerates from the fines.

More specifically, the agglomeration and subsequent separation is accomplished by feeding the fine particles onto a platform which is vibrated with a circular motion; the platform is maintained in a humid atmosphere which, for example, may be achieved by impingement of finely atomised water droplets onto the surface of the feed. It will be appreciated that there is a minimum amount of moisture necessary to effect clustering or agglomerating of the particles and there is also a maximum water content above which the moist powder is too tacky to be affected by vibratory movement; the moisture content is thus kept between 2% and 6%. The moist powder tends to cluster or agglomerate together during vibration of the platform due to the rotary motion to the particles. As a subsequent result the agglomerates tend to displace the fine particles from the centre of the platform, the fine particles travelling outwards after which they are recycled back onto the vibrating circular platform at a point intermediate of its centre and its periphery. The agglomerates are removed from the centre of the platform, for instance by suction, and subsequently dried to produce the final desired product.

Figure 1:
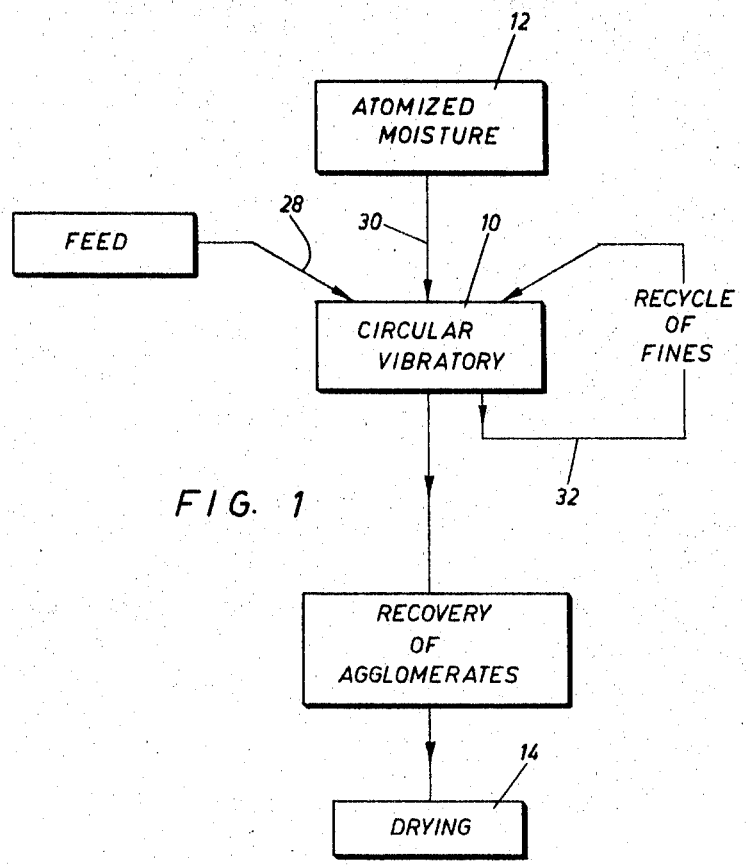
FIGURE 1 is a flow sheet outlining one procedure for carrying out the invention.

The procedure is outlined in the flow sheet of FIGURE 1. The feed of fined particles of tea powder is shown being supplied to a zone 10 maintained at a relatively high humidity e.g. with the simultaneous application of atomised moisture 12; though other means may be employed to maintain a humid atmosphere in the zone 10. The fine particles are then subjected to a vibratory circulatory movement about the centre of the zone 10 with a result that agglomeration takes place of a proportion of the particles. The agglomerates are collected at the centre of the zone 10 and extracted therefrom after which they are subjected to a drying operation 14. The fine particles which remain unagglomerated move to the outer part of the zone 10 and are re-supplied to an intermediate point of the zone with respect to its centre and its periphery. The process is continuous, fresh feed being added when necessary.

Figure 2:
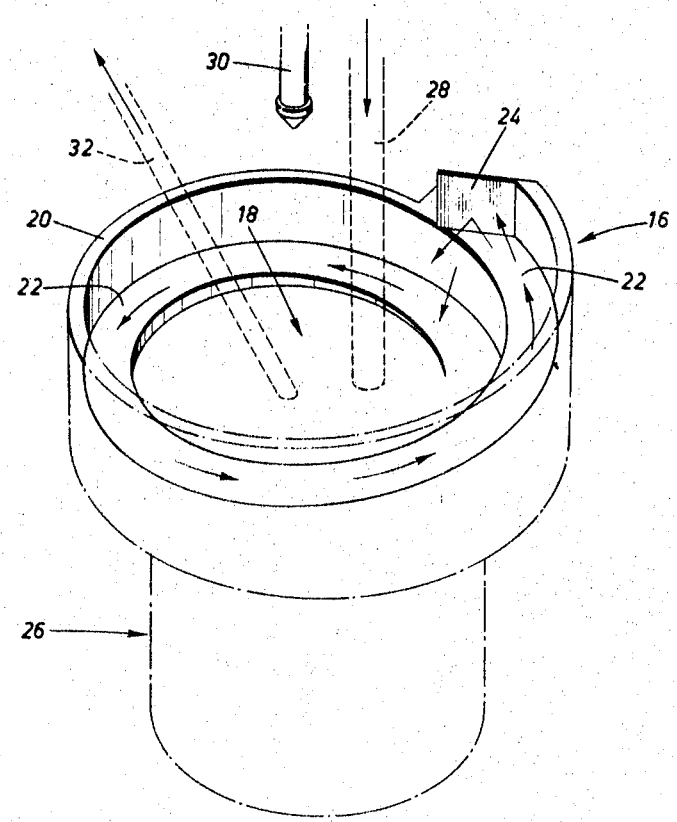
FIGURE 2 is a diagrammatic view of a form of apparatus for carrying out the procedure outlined in the flow sheet of FIGURE 1.

The procedure may be carried out by use of the apparatus shown in FIGURE 2. It consists of a vessel generally denoted by the numeral 16 which may be open topped, and having a floor or base 18 surrounded by a circular wall 20; an upwardly and outwardly extending spiral track or platform 22 is provided on the inside of the base 18, the spiral track 22 terminating in an inwardly directed baffle 24. The lower end of the spiral track 22 terminates some distance removed from the centre of the floor 18 to provide an agglomeration zone. The vessel 16 is mounted on a mechanism generally denoted by the numeral 26 which is designed to vibrate the vessel 16 not only in the vertical axis but also to impart a limited lateral arcuate movement; in this manner the particles are also provided with a circular motion.

A downwardly disposed tube 28 is positioned intermediate of the centre of the floor 18 and a point on the circular wall 20, the tube 28 providing a means for feeding fine dry tea powder to the floor 20. Centrally disposed above the vessel 16 is an atomising nozzle 30 which provides the moisture necessary to create a humid atmosphere thereby moistening the fine tea particles. An inclined tube 32 is positioned so that its outer end is adjacent the centre of the floor 18, the tube 32 being subjected to a vacuum sufficient to remove the agglomerated particles from the centre.

The feed after it has been introduced through the tube 28 is vibrated with a circulatory motion in the vessel 16 by means of the mechanism 26 while the feed is being moistened due to application of the finely atomised water droplets from the nozzle 30; this results in a portion of the fine particles agglomerating with continued vibration of the vessel 16. The particles which remain unagglomerated travel outwards and then proceed to travel upwards along the spiral track 22; when they meet the baffle 24 they are recycled through being re-directed to the floor 18 intermediate of the centre of the vessel 16 and the circular wall 20. It will be appreciated that the purpose of the spiral track 22 is solely for elevation of the fines so that they may be recycled into the agglomeration zone. Meanwhile the agglomerated particles remain at the centre, the clusters being extracted by the vacuum tube 32 to be subjected to final treatment, viz, drying by any of the conventional means.

The procedure was employed using fine tea powder and circulated on a vibrating vessel arranged as described above, the relative humidity of the atmosphere was 90% at a temperature of 90° F. The fine particles were cycled for 1¼ hours during which time large agglomerates were formed, the clusters being removed by a vacuum tube from the centre of the vessel after which they were dried in air circulating dryer for 2 hours at 120° F. Solution of the clusters in cold water was rapid and complete whereas the fine feed material formed in insoluble lumps on contact with the water and did not completely wet or dissolve.

Sieve analysis before and after agglomeration was as follows:

| U.S. sieve | Before agglomeration (percent) | After agglomeration (percent) |
|---|---|---|
| +10 | 2.3 | 24.3 |
| −10+20 | 2.3 | 43.5 |
| −20+40 | 6.3 | 29.8 |
| −40+60 | 11.1 | 2.4 |
| −60+100 | 31.4 | 0.0 |
| −100 | 46.6 | 0.0 |
|  | 100.0 | 100.0 |

Close examination of the agglomerates formed in the example show that they had an open porous structure which permits entry of water with rapid dissolution.

While certain embodiments have been illustrated and described for the purpose of disclosure, it will be understood that the invention is not limited thereto, but contemplates such modifications and other embodiments as may be utilized without departing from the invention.

I claim:

1. A continuous process for the agglomeration of fine tea powder comprising the steps of feeding and moistening said tea powder in a first zone whereby the moisture content is between 2–6%, imparting vibratory circulatory movement of said tea powder about the centre of said zone whereby a portion is agglomerated and collects at the centre of said zone, the remainder of the fine unagglomerated tea powder being displaced outward of said agglomerated portion, removing said agglomerates from said centre of said zone and drying said agglomerates at a second zone and removing and recycling said remainder into said first zone together with further feed material.

References Cited

UNITED STATES PATENTS 3,030,657  4/1962  Von Rappert _____ 23—313 X
3,083,099  3/1963  Swanson et al. _____ 99—56

MAURICE W. GREENSTEIN, Primary Examiner

U.S. Cl. X.R.

99—199, 234